US006956580B2

(12) United States Patent
Rozzi

(10) Patent No.: US 6,956,580 B2
(45) Date of Patent: Oct. 18, 2005

(54) COLOR DISPLAY DEVICE WITH INTEGRATED COLOR MATCHING PROCESSOR

(75) Inventor: William A. Rozzi, Stillwater, MN (US)

(73) Assignee: Kodak Polychrome Graphics, LLC, Norwalk, CT (US)

( * ) Notice: Subject to any disclaimer, the term of this patent is extended or adjusted under 35 U.S.C. 154(b) by 563 days.

(21) Appl. No.: 09/867,054

(22) Filed: May 29, 2001

(65) Prior Publication Data

US 2002/0180751 A1 Dec. 5, 2002

(51) Int. Cl.$^7$ .............................................. G09G 5/02
(52) U.S. Cl. ..................................... 345/589; 345/595
(58) Field of Search ............................... 345/589, 593, 345/594, 595, 600

(56) References Cited

U.S. PATENT DOCUMENTS

| | | | |
|---|---|---|---|
| 4,500,919 A | 2/1985 | Schreiber | |
| 4,926,254 A | 5/1990 | Nakatsuka | |
| 4,958,220 A | 9/1990 | Alessi | |
| 5,027,196 A | 6/1991 | Ono | |
| 5,339,176 A | 8/1994 | Smilansky | |
| 5,371,537 A | 12/1994 | Bohan | |
| 5,381,349 A | 1/1995 | Winter | |
| 5,561,459 A | 10/1996 | Stokes | |
| 5,579,031 A * | 11/1996 | Liang | 345/604 |
| 5,739,809 A | 4/1998 | McLaughlin et al. | |
| 5,907,667 A | 5/1999 | Shiraishi | |
| 5,952,992 A * | 9/1999 | Helms | 345/102 |
| 6,043,909 A | 3/2000 | Holub | |
| 6,081,254 A | 6/2000 | Tanaka et al. | |
| 6,088,038 A | 7/2000 | Edge | |
| 6,128,415 A | 10/2000 | Hultgren, III | |
| 6,480,202 B1 * | 11/2002 | Deguchi et al. | 345/600 |
| 6,577,395 B1 * | 6/2003 | Berns et al. | 356/402 |

FOREIGN PATENT DOCUMENTS

| | | |
|---|---|---|
| EP | 0 767 445 A2 | 4/1997 |
| EP | 0915615 | 12/1999 |
| EP | 1 178 672 A2 | 2/2002 |
| JP | 10-108031 | 4/1998 |

OTHER PUBLICATIONS

International Color Consortium Profile Formal Specification, Version 3.3, Nov. 11, 1996.
Copy of International Preliminary Examination Report for International Application No. PCT/US02/09112, mailed Aug. 27, 2003, 6 pages.
Copy of Written Opinion for International Application No. PCT/US02/09112, mailed Jan. 30, 2003, 4 pages.
Copy of Communication from European Patent Office for Application No. 02 719 340.8-2205, dated Apr. 14, 2004, 3 pages.
Copy of Communication to the European Patent Office for Application No. 02 719 340.8-2205, mailed Jul. 26, 2004, 16 pages.
Copy of Communication from European Patent Office for Application No. 02 719 340.8-2205, dated Sep. 13, 2004, 6 pages.
Copy of Communication to the European Patent Office for Application No. 02 719 340.8-2205, mailed Dec. 14, 2004, 14 pages.

* cited by examiner

Primary Examiner—Matthew Luu

(57) ABSTRACT

In one embodiment, a display device includes an integrated color matching processor that processes color data to facilitate accurate color rendering on the display device. The integrated color matching processor can be internal to the display device or external to the display device. Either way the processor may receive color input, process the color input, and output altered color image data to the display.

22 Claims, 12 Drawing Sheets

COLOR DISPLAY DEVICE WITH INTEGRATED COLOR MATCHING PROCESSOR

FIELD

The invention relates to color imaging and, more particularly, to presentation of color imagery on display devices.

BACKGROUND

Display devices include devices that have displays such as cathode ray tubes (CRTs), liquid crystal displays (LCDs) or other flat panel displays, digital paper, plasma displays, electronic ink displays, or other displays capable of rendering images from electromagnetic input signals. Typically, display devices make use of device-dependent coordinates to define color. For instance, a display device may use red, green, and blue (RGB) coordinates to define color. A CRT display may use different combinations of red, green, and blue phosphors to display colors within the RGB gamut of the display.

Accurate color rendering on a display device is highly desirable. For obvious reasons, it is generally desirable to render visually pleasing images to an end user. However, for some applications, such as "soft-proofing" and other color-intensive imaging applications, very accurate color rendering is imperative.

The term "soft proofing" refers to a proofing process that makes use of a display device rather than a printed hard copy. Traditionally, color proofing techniques have relied on "hard copy proofing," where proofs are printed out and inspected to ensure that the images and colors on the print media look visually correct. For instance, color characteristics can be adjusted and successive hard copy prints can be examined in a hard proofing process. After determining that a particular proof is acceptable, the color characteristics used to make the acceptable proof can be reused to mass-produce, e.g., on a printing press, large quantities of print media that look visually equivalent to the acceptable proof.

Soft proofing is desirable for many reasons. For instance, soft proofing can eliminate the need to print hard copies on media during the proofing process. Moreover, soft proofing may allow multiple proofing specialists to proof color images from remote locations simply by looking at display devices. Soft proofing can be faster and more convenient than hard proofing. Moreover, soft proofing can reduce the cost of the proofing process. For these and other reasons, soft proofing is highly desirable.

Realizing soft proofing, however, has proven to be very difficult. For instance, the inability to achieve adequate color matches between hard copies and images presented on display devices has generally limited the effectiveness of soft proofing.

Color management tools and techniques have been developed to improve the accuracy of color matching between the outputs of different devices. For instance, color profiles used to categorize and define imaging devices, and color matching software such as color matching modules (CMMs) have been developed for this purpose.

Color profiles, for instance, can be used to categorize and define a device that was used to image a particular color image. A color profile is a data structure that describes the color characteristics of a particular device. A color profile may include color information such as information describing how the device converts from device-independent coordinates to device-dependent coordinates and vice versa. In some formats, color profiles may include information categorizing the print media used (in the case of a printer) or information categorizing the phosphors (in the case of a CRT display).

Color matching modules (CMMs) are computer programs that facilitate accurate color matching. A CMM may implement an algorithm or a look-up table, for instance, to match the color output between two different devices. Using respective color profiles as input, a CMM may alter the colorimetric characteristics of color data that is sent to a second device so that the output of the second device will be a more accurate visual match to that of the first device.

A CMM is loaded on a computer that controls the second device. The second device may automatically provide the CMM with its color profile. When an image is sent to the second device, for instance, an additional file may be appended to the image to provide the CMM with the color profile of the first device. In this manner the CMM may obtain the input necessary to perform a color matching algorithm. Thus, the input to the second device can be adjusted so that the output of the second device more accurately matches the output of the first device.

In this document the term image refers broadly to any type of graphical rendering. For example, an image could simply be a page of text, a picture, a chart, or another pictorial device such as user interface elements like buttons or windows generated by a computer's operating system software. Generally, a graphical element or any collection of graphical elements can comprise an image.

SUMMARY OF THE INVENTION

The invention may comprise a display device that includes a display that presents color images, and a processor integrated with the display device that adjusts the color images. The display, for instance, may be a CRT, an LCD or other flat screen display, digital paper, a plasma display, an electronic ink display, or any other display capable of rendering images from electromagnetic input signals.

The processor may receive color input, process the color input, and output altered color image data to the display. The color input may include internal color input and external color input. Internal color input includes input received from the display. For instance, internal color input may include a display profile or sensed conditions sensed by the display. External color input includes input received from a source other than the display. External color input, for example, may include a source device profile, image data, sensed conditions sensed by a source external to the display, or user input.

In another example, the processor may receive color input including a display profile, a source profile, and image data. The processor may then process the input to generate altered image data, and output the altered image data to the display. The display device can then render images according to the altered image data. In this manner, images rendered by the display device may visually match images rendered by a source device associated with the source profile.

The display device may further comprise an integrated archive coupled to the processor. For instance, the archive may comprise an electrically-erasable-programmable-read-only-memory, random access memory, or any other suitable memory device. The processor may receive color input including a display profile, a source profile, and image data. The processor may check the archive to determine whether altered image data has already been processed for the color input. The processor may then process the color input to generate altered image data if the altered image data has not already been processed, and output the altered image data to the display.

The integrated processor and archive, if desired, may be housed within the display device. Alternatively, the processor and archive may be housed within a color matching hardware unit that is coupled to the display device.

In another embodiment a method may include receiving color input in a display device and processing the color input in a processor integral with the display device to generate altered image data. The method may also include displaying color according to the altered image data.

Receiving color input in the display device may comprise receiving internal input and external input. For instance, receiving internal input may include receiving sensed conditions from the display device and receiving a display profile from the display device. Receiving external input may include receiving sensed conditions, e.g. from a source other than the display device. Moreover, receiving external input may include receiving image data, a source profile, and/or user input.

Processing the color input in a processor integral with the display device may comprise processing the color input in a processor internal to the display device. Alternatively, processing the color input in a processor integral with the display device may comprise processing the color input in a processor internal to a color matching hardware unit coupled to the display device.

The method may further comprise generating a link. The link may then be stored in an archive integral with the display device. The archive may be coupled to the processor, for instance, to store links. A link is a mapping of image data from a source device such as a printer or scanner, to a destination device such as the display device.

In yet another embodiment, the invention may comprise a color matching hardware unit integral with a display device. The color matching hardware unit may comprise a housing and a processor in the housing. The processor may receive color input, process the color input, and output altered color image data to the display device. The color matching hardware unit may also include an archive in the housing, and the archive may be coupled to the processor. For instance, the processor may generate a link and store the link in the archive.

In still anther embodiment, a system may include a plurality of display devices, each display device including an integral color matching processor. The system may also include a color management control coupled to the display devices, and at least one printing device coupled to the color management control. Each respective color matching processor may receive color input from the color management unit and process the color input. Each respective color matching processor may then output altered color image data to the respective display device associated with the respective color matching processor. Each respective color matching processor may also receive color input from the respective display device associated with the respective color matching processor.

The integral color matching processors may be internal to the display devices. Alternatively, the integral color matching processors may be housed in color matching hardware units. For instance, the system may further include a plurality of color matching hardware units, each hardware unit corresponding to one of the display devices and each hardware unit housing one of the integral color matching processors. The system may further include a plurality of archives, wherein each archive is coupled to one of the integral color matching processors.

Additional details of these and other embodiments are set forth in the accompanying drawings and the description below. Other features, objects and advantages will become apparent from the description and drawings, and from the claims.

DETAILED DESCRIPTION

In exemplary embodiments, the invention comprises a display device that includes an integrated color matching processor that processes color data to facilitate accurate color rendering on the display device. By way of example, the processor may be a programmable processor, an application specific integrated circuit (ASIC) or a field programmable gate array (FPGA) that performs functions traditionally performed by color matching modules (CMMs) external to the display device. The integrated color matching processor may increase the speed, accuracy, functionality, and/or flexibility of color rendering on the display device. In particular, the color matching processor may eliminate the need for the RGB conversions, e.g., RGB to sRGB and sRGB to RGB, ordinarily required within a host computer that drives a display device.

Moreover, the integrated processor can be configured to perform functions above and beyond those performed by the external CMMs that typically execute on a host computer. For example, the display may also include additional intelligence, such as sensors and the like, to provide input to the internal color matching processor concerning viewing conditions and user preferences. The additional intelligence, along with the color matching processor can form part of the display device. As a result, in some embodiments, color image data representative of a color image can be transmitted directly the display device without the need for significant color processing by any host computer. The display device may receive the color image data in digital or analog form, depending on the interface capabilities of the particular display device. In most embodiments, a digital interface will be desirable so that the color matching processor may perform color matching operations on the digital image data without the need for intermediate analog to digital conversion or processing of analog color values.

In one embodiment, the invention comprises a display device including an integrated processor programmed with functionality similar to that of a CMM. CMMs are traditionally embodied in software that is executed in a general-purpose host computer external to the display. For example, the general-purpose computer may include a central processing unit (CPU) that manages and executes instructions to control a number of peripheral devices including the display device. Integrating a processor into the display device can add substantial costs to the display device. However, as described in detail below, numerous advantages can be achieved by integrating a special purpose color matching processor within a display device.

Figure 1:
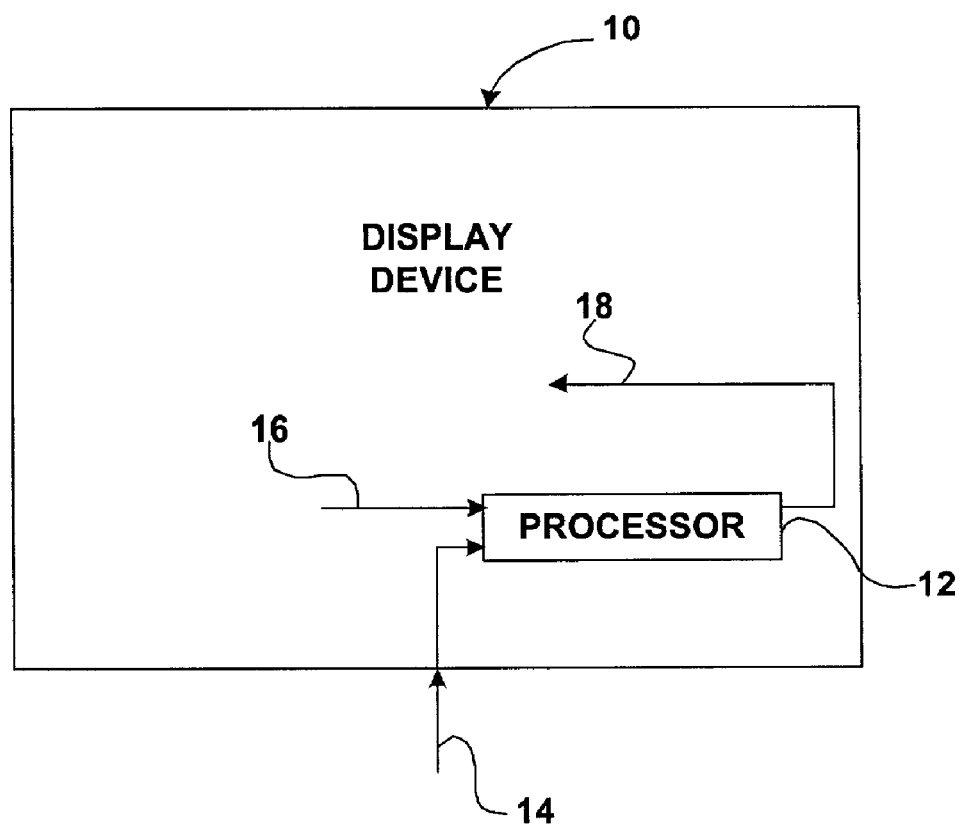
FIG. 1 is a block diagram of a display device with an integrated color matching processor according to an embodiment of the invention.

FIG. 1 is a block diagram according to an embodiment of the invention. As shown, a display device 10 includes a color matching processor 12. Display device 10 may include a display such as a CRT, an LCD or other flat screen display, digital paper, a plasma display, an electronic ink display, or any other display capable of rendering images from electromagnetic input signals. Processor 12, for instance, may be programmable hardware that has been programmed to facilitate color matching between display device 10 and a source device. By way of example, processor 12 may be an ASIC, an FPGA, or a general-purpose programmable microprocessor.

Processor 12 may receive input from internal display electronics, e.g., internal input as indicated by reference numeral 16, and external input from other computers or rendering devices, as indicated by reference numeral 14. External input 14 and internal input 16 may be received by processor 12 via a bus (not shown). Processor 12 may process data communicated via the respective internal and external inputs 16, 14 to produce a display signal 18 for controlling and/or altering colorimetric characteristics of display device 10. For example, processor 12 may apply color transformations to image data in image files received at external input 14, apply calibrations to drive signals applied to the display electronics, or both.

Internal input 16, for example, may include a display device profile that defines colorimetric or spectrally-based characteristics of display device 10. Alternatively, the display profile may be embedded as part of processor 12. Internal input 16 may also include additional information such as sensed illuminant conditions or sensed display emissions obtained from sensors coupled to or integrated with display device 10. Copending and commonly assigned U.S. application Ser. No. 09/867,053, to William A. Rozzi, entitled "DISPLAY SYSTEM" filed the same day as this application, describes an illuminant condition sensor that is embedded in a display device to provide information describing the illuminant conditions surrounding the display. Internal input 16 may include illuminant condition data obtained from such an illuminant condition sensor, as well as other information such as sensed display emission information. The content of the above-referenced patent application is incorporated herein by reference in its entirety.

External input 14, for example, may include image data, a source device profile, and/or user input. Image data may be a large collection of colorimetric pixel data defining an image for presentation on a display device. The pixel data may be part of an image file defining raster image data for presentation of an image. For example, image data may include a large collection of device-dependent coordinates, e.g., RGB. Each device-dependent coordinate may define the color of a particular pixel in the image. A source device profile is a data structure that describes the color characteristics of a source device that produced the image or a source device for which the image data was originally intended. The source device, for example, may be a printer, scanner, or camera, or another display device. User input may include additional parameters entered by a user that affect the visual appearance of color. User input, for example, may include information relating to desired print media, illuminant conditions, gamut rendering selections, and/or display emissions.

In one embodiment, the source profile forms part of the raster image data. For instance, the source profile could be appended to an image file. Alternatively, the source profile could be embedded in raster image data of an image file as described in copending and commonly assigned U.S. application Ser. No. 09/867,055, to William A. Rozzi, entitled "EMBEDDING COLOR PROFILES IN RASTER IMAGE DATA USING DATA HIDING TECHNIQUES" filed the same day as this application. The content of the above-referenced patent application is incorporated herein by reference in its entirety.

Figure 2:
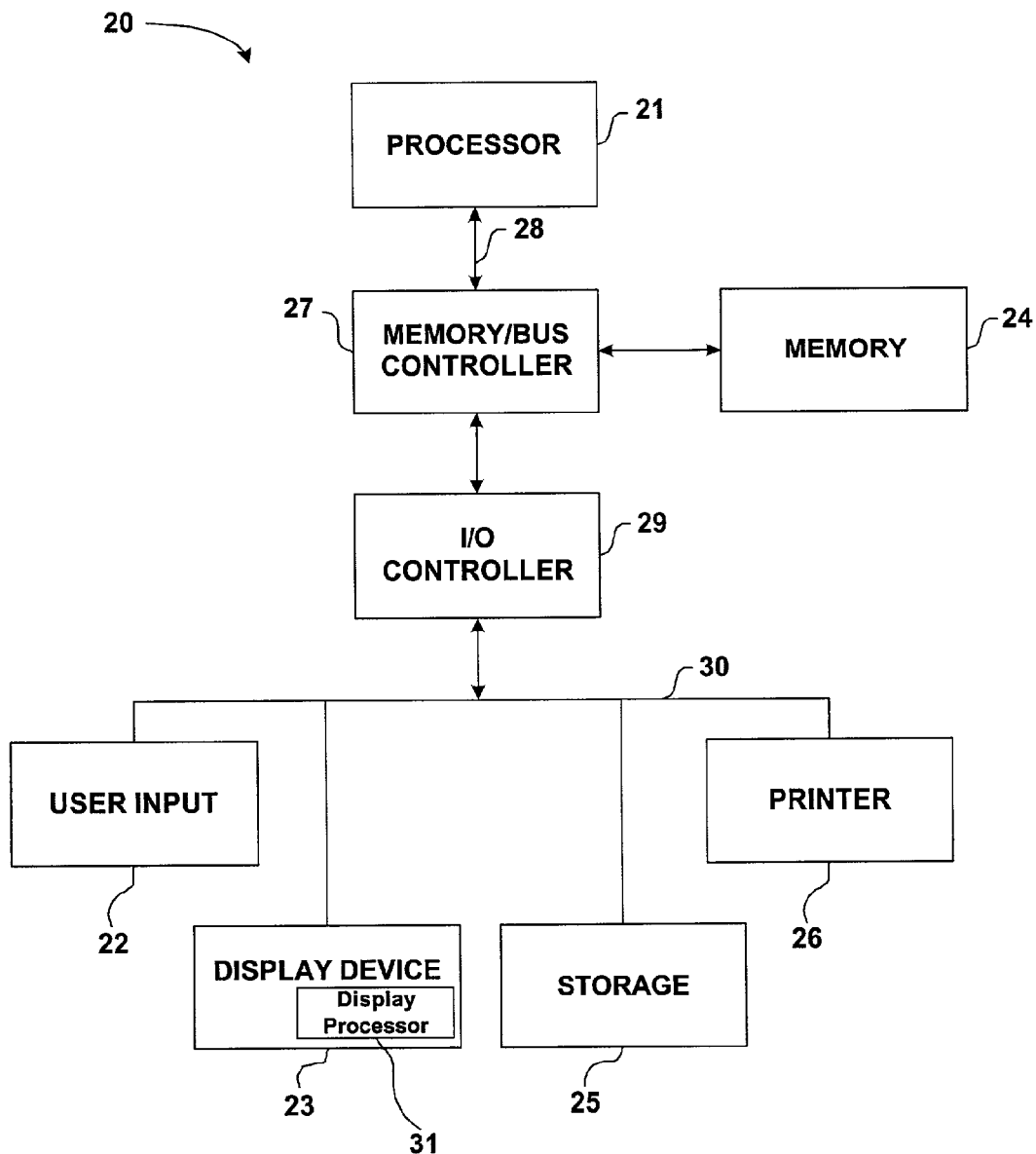
FIG. 2 is a block diagram illustrating a system suitable for use with a display having an integrated color matching processor according to embodiments of the invention.

FIG. 2 is a block diagram illustrating a computer system 20 suitable for use with a display device having an integrated color matching processor according to embodiments of the invention. As shown in FIG. 2, computer system 20 may include a general purpose processor 21, a user input device 22, a display device 23, memory 24, a storage device 25, and a printer 26. Display device 23, for example, may be a display device having a color matching processor 31 programmed to process color data and thereby facilitate accurate color rendering on the display device 23.

Other than the display processor 31 that is integrated as part of display device 23, system 20 may substantially conform to conventional systems used by graphic artists and other users in the creation of graphic imagery for electronic display or print production. A memory/bus controller 27 and system bus 28 couple general purpose processor 21 and memory 24, while one or more I/O controllers 29 and I/O bus 30 couple the general purpose processor 21 and memory 24 to user input device 22, display device 23, storage device 25, and printer 26.

General purpose processor 21 may take the form of a general purpose microprocessor and can be integrated with or form part of a PC, Macintosh, computer workstation, hand-held data terminal, palm computer, digital paper system, or the like. User input device 22 may include a conventional keyboard and pointing device such as a mouse, pen, trackball, infra-red pointing device, or touch sensitive stylus, if desired. Memory 24 may include random access memory (RAM) storing program code that is accessed and executed by general purpose processor 21 to carry out methods of color imaging.

Figure 3:
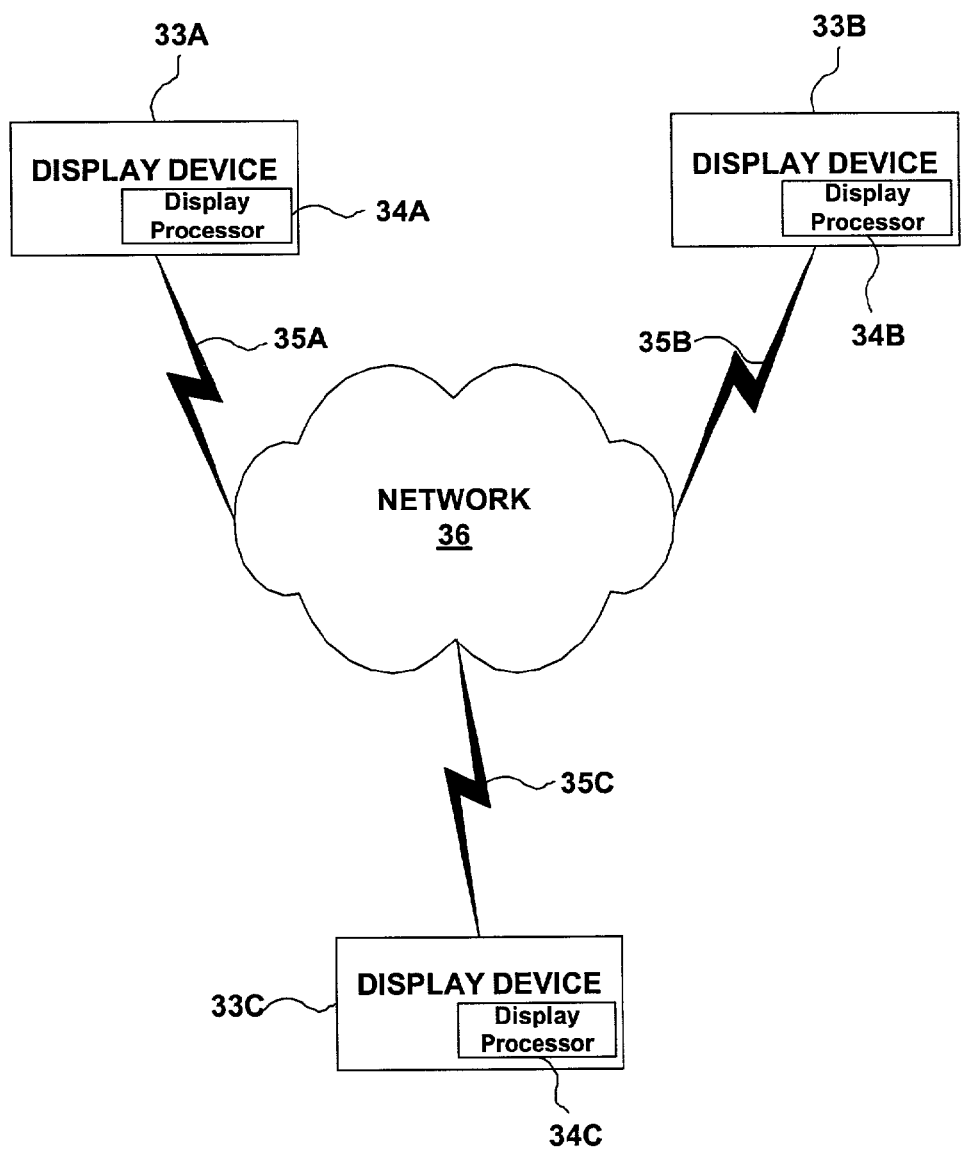
FIG. 3 is a block diagram of a system having multiple displays connected to a network.

FIG. 3 is a block diagram of another computer system according to the invention. As shown, a number of display devices 33A–33C may be connected to network 36 via communication links 35A–35C. Communication links 35A–35C can be wired or wireless. The display devices 33A–33C may have display processors 34A–34C programmed to process color data and thereby facilitate accurate color rendering on the respective display devices 33A–33C. The display devices 33A–33C may not have individual host computers associated respectively with each device. Rather, display devices 33A–33C may receive color image data from any of a number of devices within network 36. Display processors 34A–34C can process color image data received by a respective display device 33A–33C to facilitate accurate color rendering.

Figure 4:
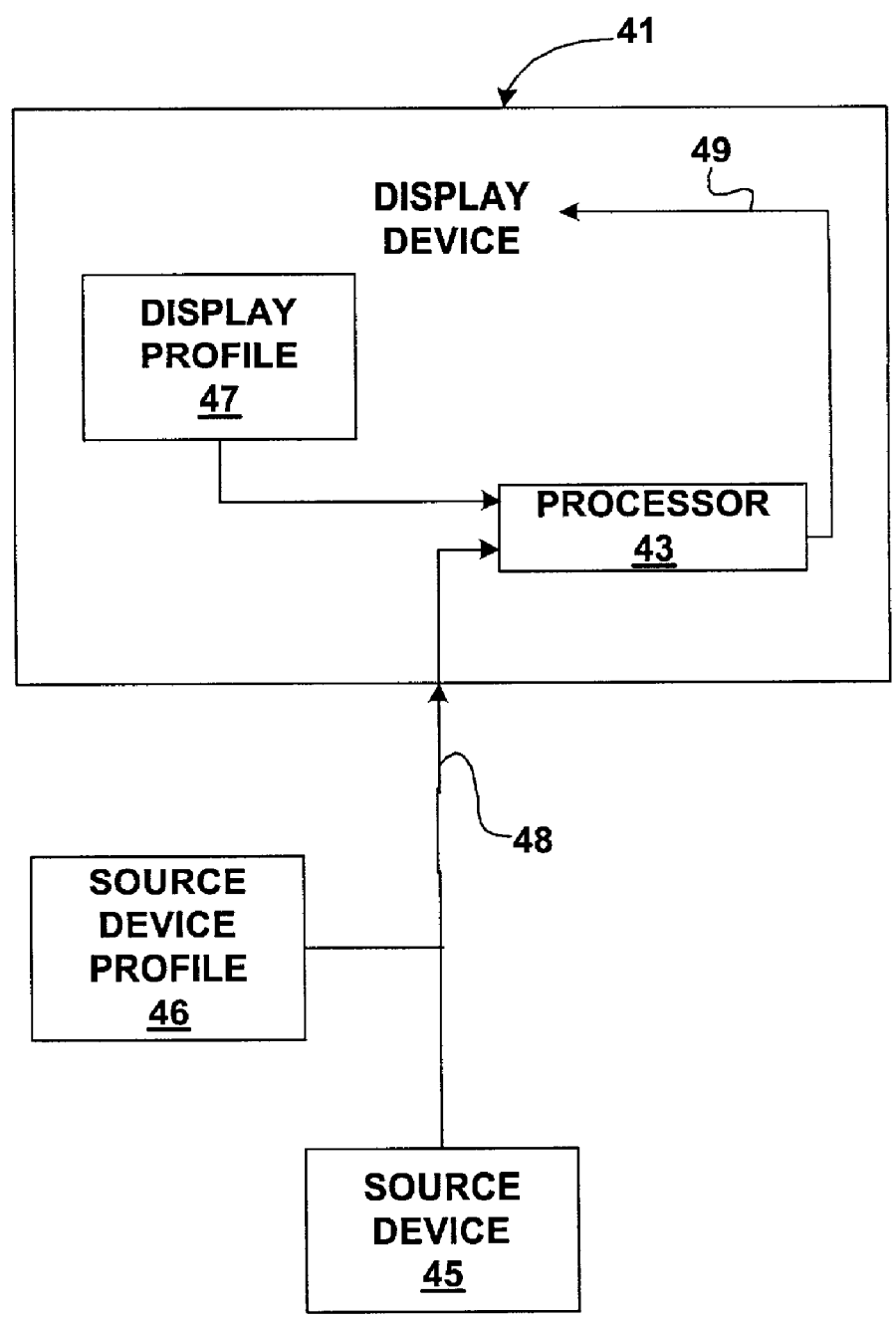
FIG. 4 is a block diagram of a color management system according to an embodiment of the invention.

FIG. 4 is a block diagram of a color management system according to an embodiment of the invention. FIG. 4 illustrates a system compatible with International Color Consortium (ICC) standards.

As shown in FIG. 4, display device 41 includes an integrated color matching processor 43. Processor 43 may include color management circuitry that facilitates color matching between display device 41 and a source device 45. The functionality of a color matching computer program, for example, can be implemented in an ASIC to realize processor 43. Source device 45 may be coupled to display 41 either directly, or via a network, providing display 41 with image data. For example, source device 45 may be an imaging device such as a display device, a printer or a scanner. Host computers associated with source device 45 may communicate color image files and source profiles to display device. Alternatively, in some embodiments, source device 45 may not have an associated host computer. Rather, source device 45 may receive image files over a network. In either case, however, the color image files and source profiles need not be processed or converted by a host computer associated with display device 41. Instead, the files and profiles may be communicated to display device 41 in their original form for processing by color matching processor 43. By way of example, display device 41 may include a display such as a CRT, an LCD or other flat screen display, digital paper, a plasma display, an electronic ink display, or any other display capable of rendering images from electromagnetic input signals.

The source device profile 46 and the display profile 47 can provide color matching processor 43 with input that facilitates color matching between the source device 45 and display 41. In this case, display profile 47 serves as a destination profile for the image. For example, the source and display (destination) profiles 46, 47 may provide transformations for transforming device-dependent coordinates of image data to device-independent coordinates. The transformations can be in the form of one or more algorithms, mathematical relationships or look-up tables. In some implementations, the profiles 46, 47 may include both forward and reverse transformations of device-dependent coordinates to device-independent coordinates. A source profile for a printer, for example, may define a forward transformation from the device-dependent cyan-magenta-yellow-black (CMYK) color space to the device-independent XYZ color space. A destination profile for display device 41 could define forward transformation from the device-dependent RGB color space to the device-independent XYZ color space.

Thus, the forward transformation transforms device-dependent coordinates to device-independent coordinates, and the reverse transformation transforms device-independent coordinates to device-dependent coordinates. The device-independent coordinates, for example, may be in any of a variety of color spaces, such as spectral coordinates, XYZ coordinates, L*a*b* coordinates, L*u*v* coordinates, or custom color space coordinates. The device-dependent coordinates may be RGB coordinates, CMYK coordinates, or the like. Processor 43 can be configured to apply the transformations provided by the source and destination profiles to adjust image data in a manner that improves the visual match between images rendered by display device 41 and source device 45.

Display device 41 may be coupled to source device 45 or a host computer associated with the source device, for example, to receive image data. The image data and source device profile 46 may be inputted into display device 41 via a digital input (indicated at 48). Inside the display, the image data, source device profile 46, and display profile 47 may be inputted into color matching processor 43 where the image data is manipulated according to the data in the profiles 46, 47. The output 49 of processor 43 may be image data that has been adjusted to enhance the visual match between the output of display 41 and output of the source device 34. Using the source and destination profiles, color matching processor 43 may generate a device link that serves to transform color image data produced for the source device so that it can be displayed with greater color accuracy on the destination device, i.e., display device 41.

The system illustrated in FIG. 4 may be implemented if traditional ICC profiles are used in the color rendering process. Implementing color management circuitry in a processor 43 that forms part of display device 41 may improve the speed and accuracy at which the ICC profiles are processed in color matching.

The ICC color profiles can be referred to as "early binding" profiles in the sense that they require a static set of all system conditions at the time of profile generation. In other words, every variable that can affect the color rendering process must be fixed when the profile is generated. For instance, illuminant conditions and other variables such as print media, gamut rendering selections, and display emissions are made integral parts of ICC profiles, rather than represented as discrete components. If any variable changes, a new profile must be generated, creating considerable disadvantages in terms of processing overhead.

A different approach is a "late binding" approach. Profiles implemented in a late binding approach are referred to as "late binding" profiles. Late binding profiles, for instance, may still include basic colorimetric or spectrally-based information characterizing the response of a particular rendering device. However, illuminant condition information and other variables affecting the visual appearance of images such as print media, gamut rendering selections, and/or display emissions need not form part of the basic color profile. Rather, illuminant condition information and other variables can be represented as late binding variables that are either generated by sensors or inputted by users, and then added to the process later. As will become apparent, when a late binding approach is used in accordance with the invention, numerous additional advantages can be realized.

Figure 5:
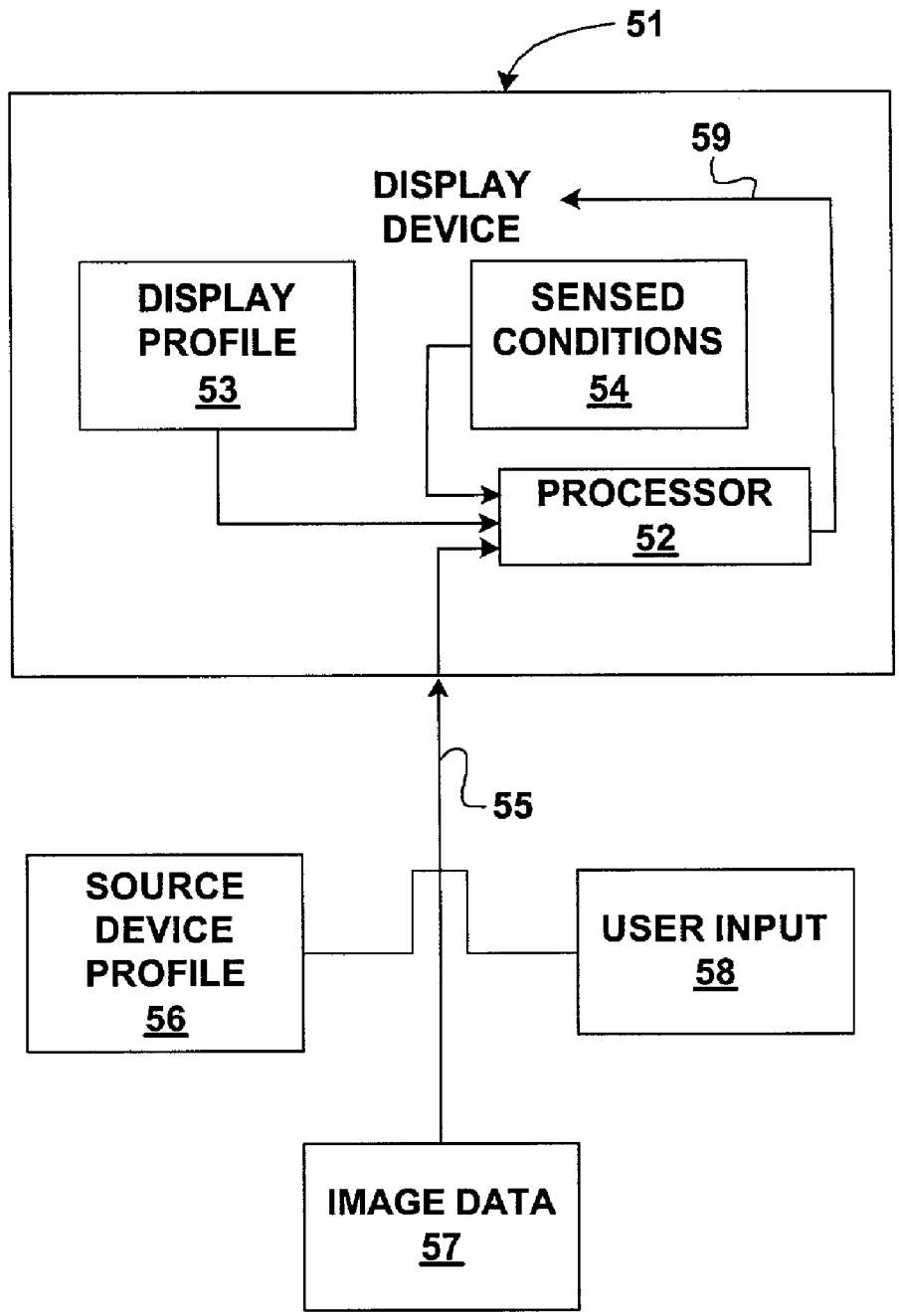
FIGS. 5–7 are additional block diagrams according to embodiments of the invention.

FIG. 5 is another block diagram according to an embodiment of the invention. As shown, display device 51 includes a color matching processor 52. Again, processor 52 may include color management circuitry that facilitates color matching between display device 51 and a source device (not shown). A computer program, for example, can be implemented in an ASIC to realize a processor 52 with color management circuitry. Also, display device 51 may include a display such as a CRT, an LCD or other flat screen display, digital paper, a plasma display, an electronic ink display, or any other display capable of rendering images from electromagnetic input signals.

Processor 52 may receive input from sources internal to display 51 and external to display 51. For example, display profile 53 is internal input because it can be provided to processor 52 from display 51. Alternatively, display profile 53 can be integrated as part of color management circuitry in processor 52.

Sensed conditions 54 can also be provided to processor 52 as internal input. For example, as described in detail in copending and commonly assigned U.S. application Ser. No. 09/867,053, to William A. Rozzi, entitled "DISPLAY SYSTEM" filed the same day as this application, display 51 may include one or more sensors to provide illuminant condition information or display emission characteristic information. Alternatively, sensed conditions 54 can be provided as external input, e.g., via an external sensor.

External input may be provided to display 51 via one or more digital inputs to the display (indicated at 55). As shown, external input may include a source device profile 56, image data 57, and/or user input 58.

The internal and external input can collectively provide processor 52 with the necessary information to facilitate color matching between a source device associated with the source device profile 56 and the display 51. Again, the profiles 53, 56 can provide transformations for transforming device-dependent coordinates of image data to device-independent coordinates. Processor can apply these transformations along with the other internal and external input to adjust image data in a manner that improves the visual match between images rendered by display 51 and a source device.

The system of FIG. 5 may implement a late binding approach to color management. Display profile 53 and source device profile 57 may provide transformations used by processor 52 to transform image data 57 into a display signal 59 such that the output of display 51 is a more accurate visual match to a source device associated with source device profile 56. User input 58 and sensed conditions 54 may be late binding variables that are used by processor along with the profiles 53, 56 to generate display signal 59. If user input 58 or sensed conditions 54 change, output 59 may change. Importantly, however, new profiles may not need to be generated. In this manner, processor 52 can quickly and efficiently adjust the visual appearance of display 51 when variables that affect the visual appearance of the display 51 change.

Figure 6:
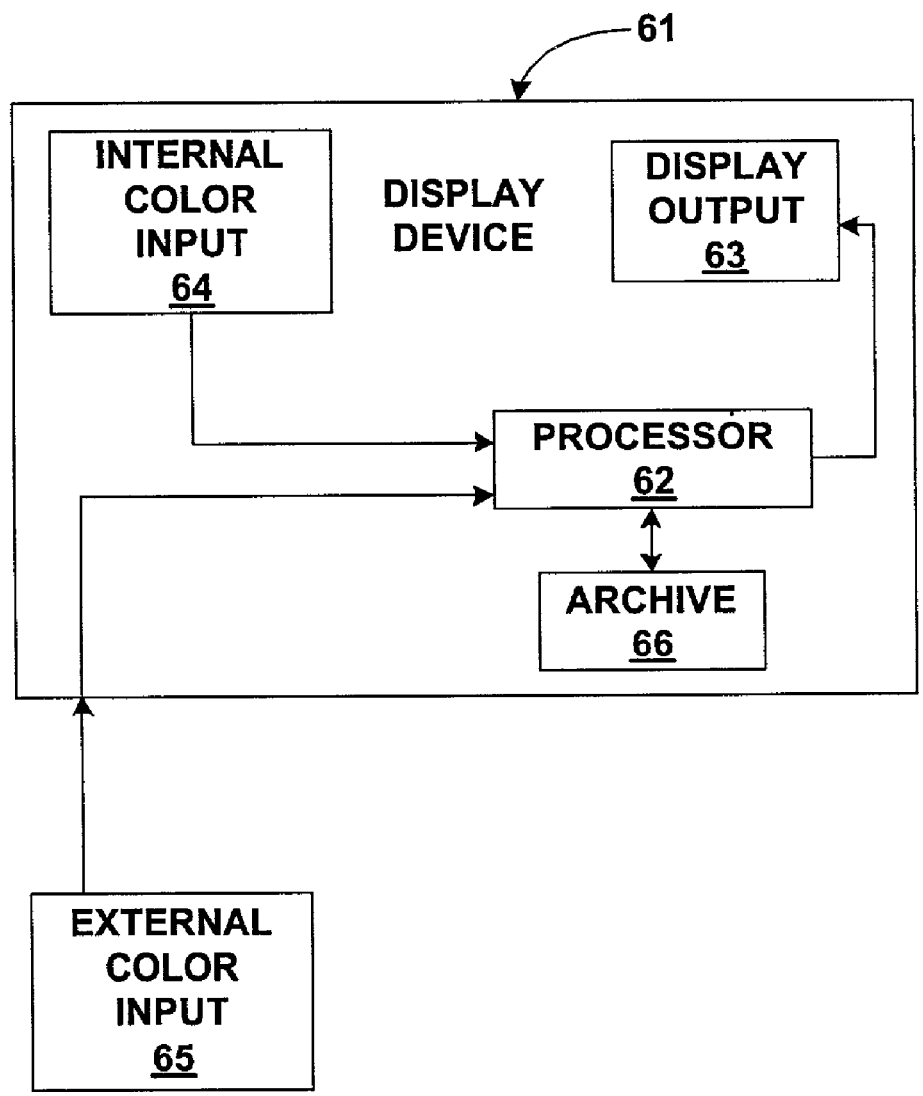

FIG. 6 is yet another block diagram according to an embodiment of the invention. As shown, display device 61 includes a processor 62. Again, processor 62 may facilitate color matching between display device 61 and a source device (not shown). For example, processor 62 may be programmed to operate in a manner that is similar to the operation of processors 43 and 52 illustrated in FIGS. 4 and 5 respectively.

The output of processor 62 may produce at least part of a display output signal 63. Processor 63 may process internal color input 64 and external color input 65 to generate the display output signal 63. Display output signal 63 may improve the visual match between images rendered by display device 61 and a source device.

Display device 61 may also implement an archive 66. Archive 66, for example, may be provided in a memory device such as an EEPROM, RAM, or other suitable storage device. Archive 66, can be coupled to processor 62 to enable output of processor 62 to be stored for later use. For example, if the same internal input 64 and external input 65 is later inputted into display device 61, processor 62 may not need to process the input to produce adjusted image data. In other words, if the same color image is later presented to display device 61, and the same image is again associated with the same source device, the same illuminant conditions, and the same other characteristics as previously received image, it may not be necessary to recalculate the adjusted image data. Rather, processor 62 can call the adjusted image data from archive 66, where it was stored the first time the same internal input 64 and external input 65 was processed. In this sense, a previously calculated set of data is cached by display device 61 for later use in the event the same source to destination scenario arises in the future.

The information stored in archive 66 can be stored as device links. A link is a mapping of image data from a particular source device to the display device 61 given a common set of variables. The link may be applied to image data, for example, to generate adjusted image data and thereby improve the visual match between display device 61 and the source device. The link is dependent on the variables supported by processor 62, e.g., the internal color input 64 and external color input 65. Once processor 62 has generated a link, the link can be stored in archive 66. Later, if the same variables are introduced to display device 61, processor may not need to reprocess the same data. Rather, the link associated with those variables can be called from archive 66 by processor 62. In this manner, display output signals 63 may be sent to display device 61 much more quickly because computational overhead is avoided.

Figure 7:
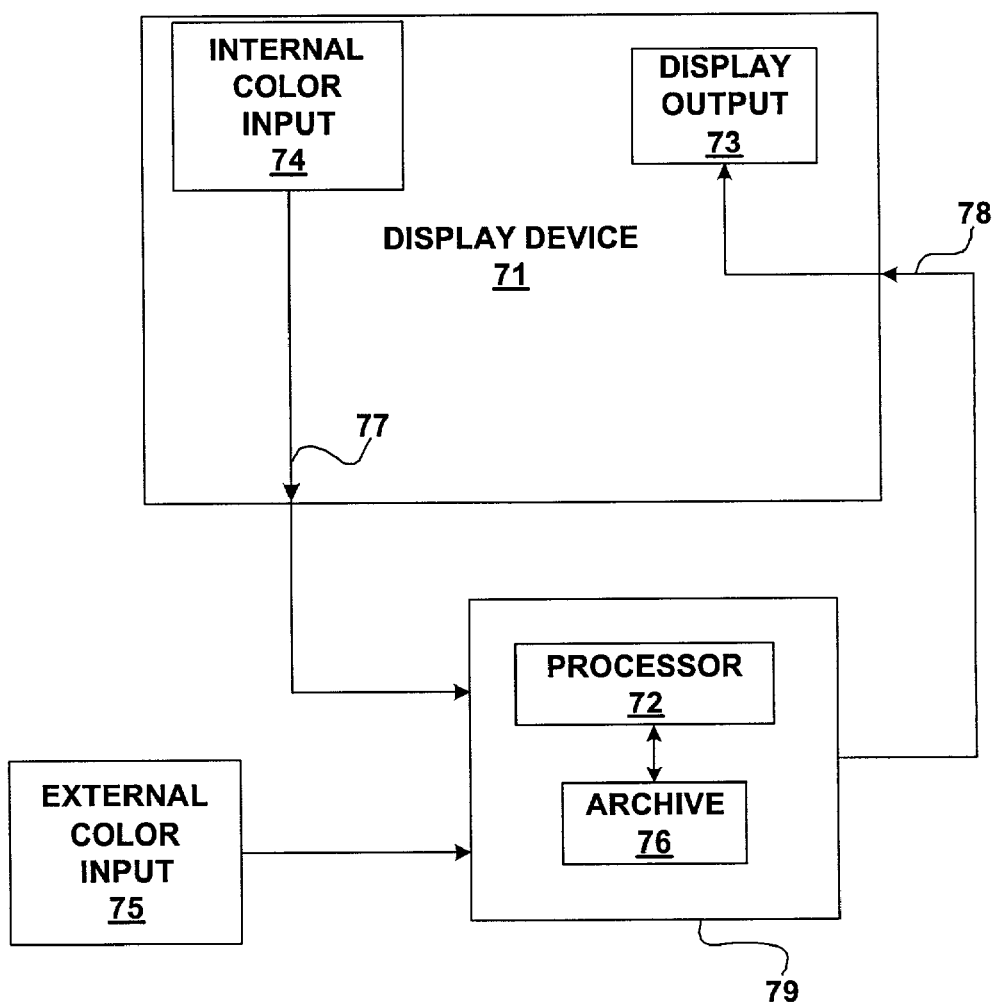

FIG. 7 is yet another block diagram according to an embodiment of the invention. As shown, display device 71 includes a processor 72 that is integral with display device 71. However, processor 71 is not internal to display device 71, i.e., it is not housed within the housing of the display device 71. Again, processor 72 may facilitate color matching between display device 71 and a source device (not shown). For example, processor 72 may be programmed to operate in a manner that is similar to the operation of processors 43, 52, 62, illustrated in FIGS. 4, 5 and 6 respectively.

In FIG. 7, although processor 72 is integral with display device 71, it is not internal to display device 71. Processor 72 is integral with display device 71 because it is associated solely with display device 71 and not a host computer. Processor 72 and archive 76, if desired, can be housed in color matching hardware unit 79. Color matching hardware unit 79, for example, may be a stand alone unit that can be coupled to display device 71 to facilitate accurate color rendering on display device 71. In this manner, color matching hardware unit 79 is integral with display device 71.

Color matching hardware unit 79 may receive external color input 75, e.g., from a source device, a host computer associated with a source device, or from a network connection. In addition, color matching hardware 79 may receive internal color input 74 from display device 71, e.g., via a digital output of display device 71 indicated by reference numeral 77. The internal and external input may then be processed by processor 72 inside color matching hardware unit 79. The output of color matching hardware unit 79 may be a signal for producing display output 73 on display device 71. The output of color matching hardware unit 79, for example, may be received by display device 71 via a digital input of display device 71 indicated by reference numeral 78. In some embodiments, digital input 78 and digital output 77 may comprise a single digital connection between display device 71 and color matching hardware unit 79.

Figure 8:
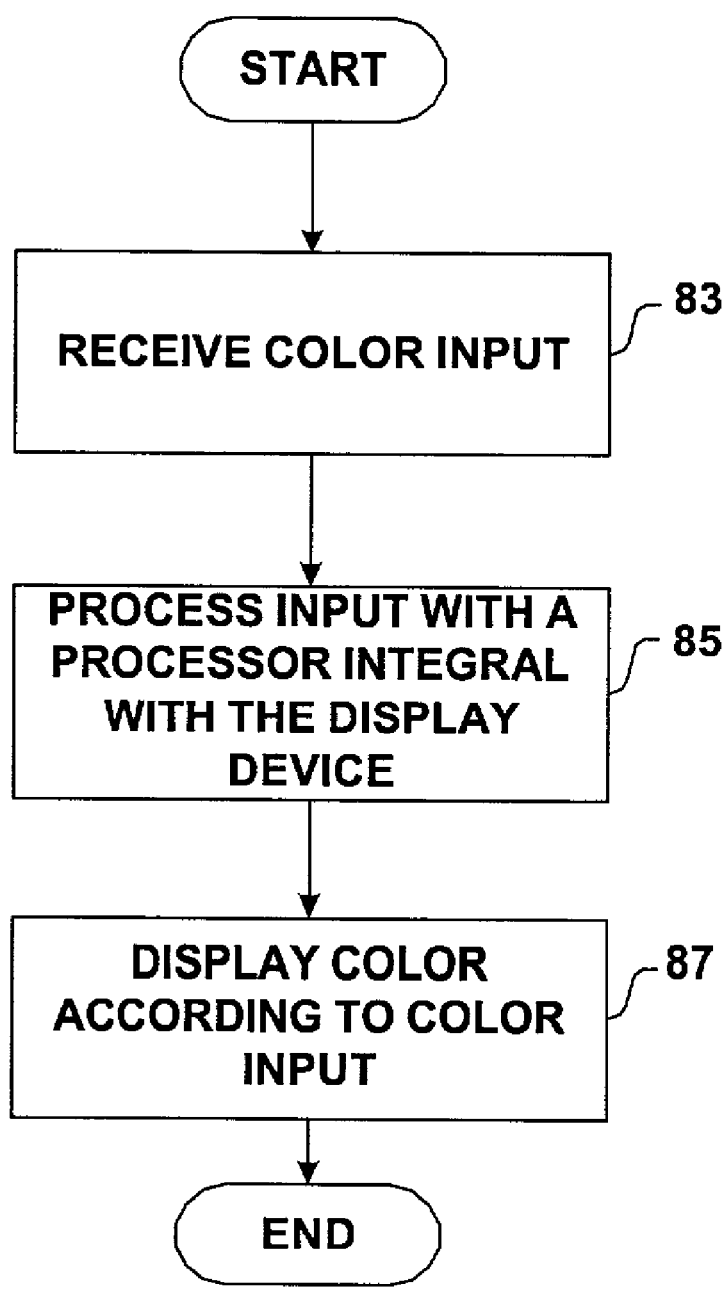
FIGS. 8–11 are flow diagrams according to embodiments of the invention.

FIG. 8 is a flow diagram according to an embodiment of the invention. As shown, color input is received (83). The input can then be processed by a processor integral with the display device (85), e.g., a processor inside the display device, or a processor inside a color matching hardware unit that is coupled to the display device. After processing the color input (85), color can be displayed according to the input (87).

The color input may include a profile of the display device, and may also include sensed information such as illuminant conditions or display emission characteristics that have been automatically sensed by the display device. In addition, the color input can include a source device profile and image data. Moreover, the color input may include user input.

A processor can be embedded in a display to internally process color input or may be embedded in a color matching hardware unit coupled to the display device. For example, the processor may include color management circuitry that facilitates color matching between the display device and a source device. The output of processor can be coupled to the display device so that the output of the processor causes the display device to generate color according to the color input (87).

Figure 9:
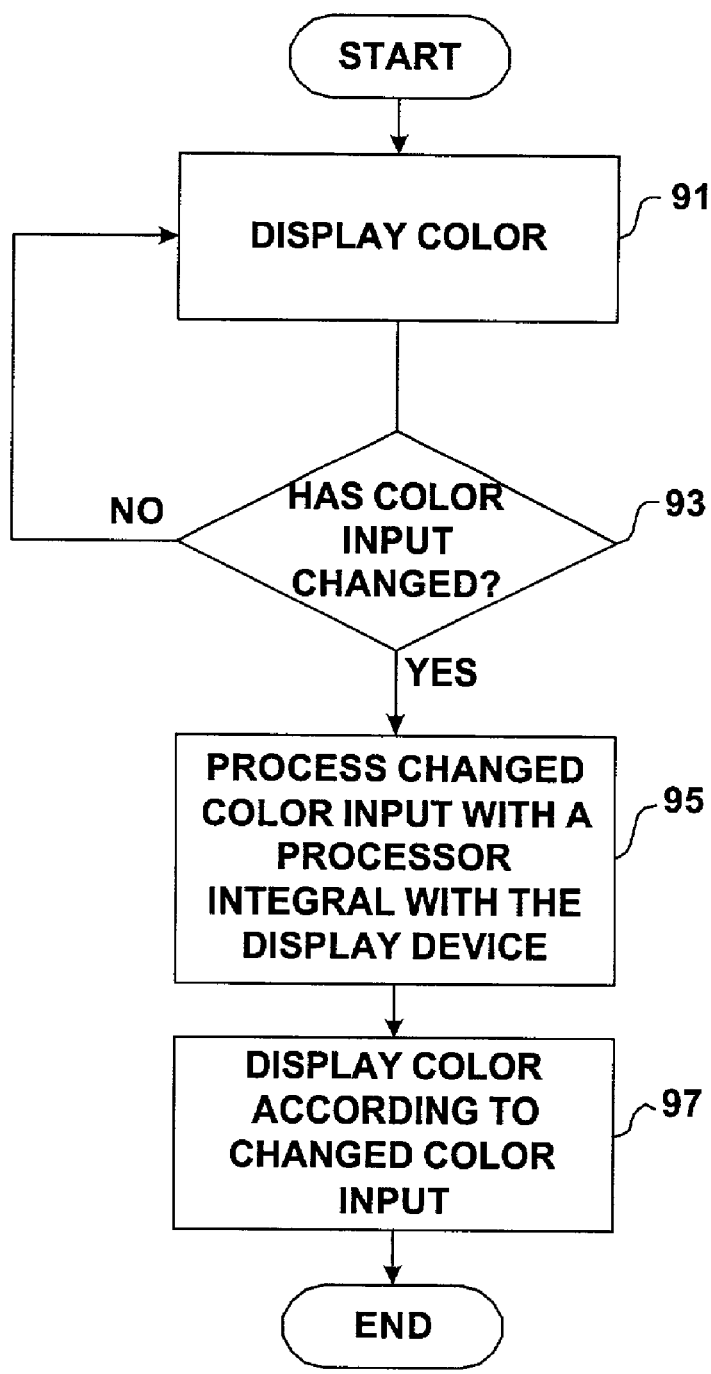

FIG. 9 is another flow diagram according to an embodiment of the invention. As shown, color is displayed (91). For example, color may be displayed in a manner consistent with the process illustrated in FIG. 8. However if any of the color inputs change (yes branch of 93), the changed color input may be re-processed (95). Color may then be displayed according to the changed color input (97).

FIG. 9 illustrates the adaptability of color rendering that can be achieved with a late binding approach. If input variables change, the color that appears on the display may likewise change. Moreover, by implementing a processor integral with the display device to achieve color matching, the changes to the output of the display can occur almost instantaneously.

Figure 10:
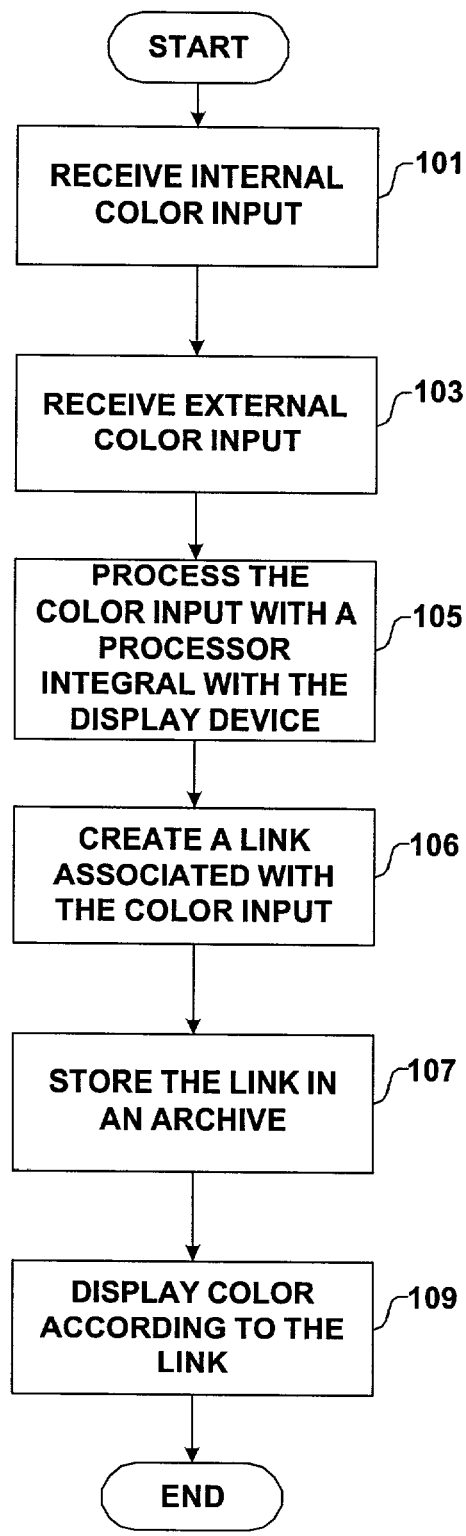

FIG. 10 is yet another flow diagram according to an embodiment of the invention. As shown, internal color input is received (101) and external color input is received (103). Having received the input, it can be processed integral with the display device (105), e.g., inside a display device by a processor, or inside a color matching hardware unit coupled to the display device. The processor can create a link associated with the respective color input (106), and the link can be stored in an archive (107). Color can then be displayed according to the link (109).

Again, the link is a mapping of image data from a particular source to the display, given a common set of variables, e.g., a common set of internal input and a common set of external input. The link may be applied to image data, for example, to generate adjusted image data. The adjusted image data can be sent to the display, thereby improving the visual match between the display device a source device.

Figure 11:
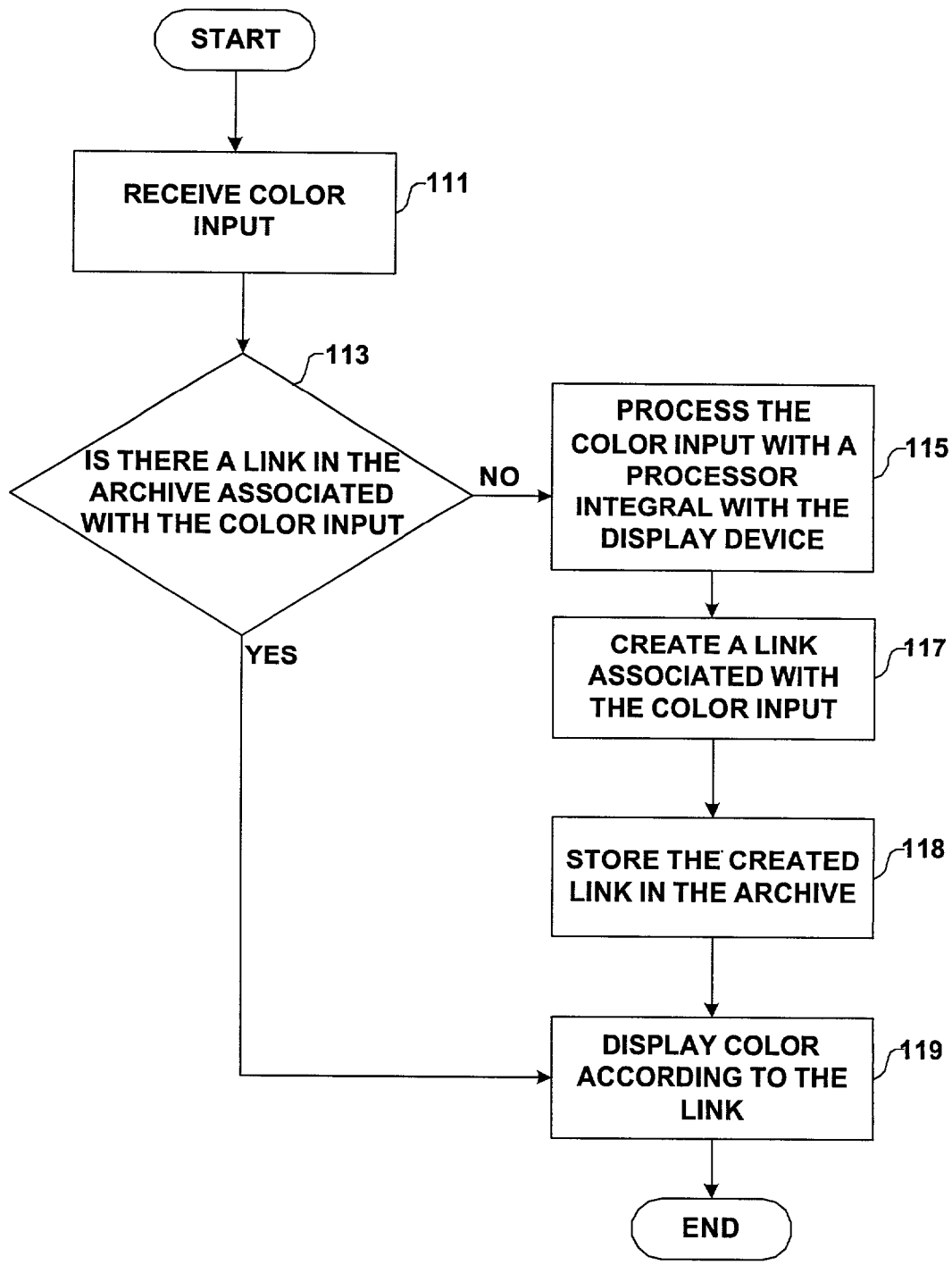

FIG. 11 is another flow diagram according to an embodiment of the invention. As shown, color input is received (111). If there is a link in the archive associated with the color input (yes branch of 113), then color is displayed according to the link (119). However, if there is not a link in the archive associated with the color input (no branch of 113), then the color input is processed integral with the display device (115). The processing can create a link associated with the color input (117) and the created link can be stored in the archive (118). Color can then be displayed according to the link (119).

Figure 12:
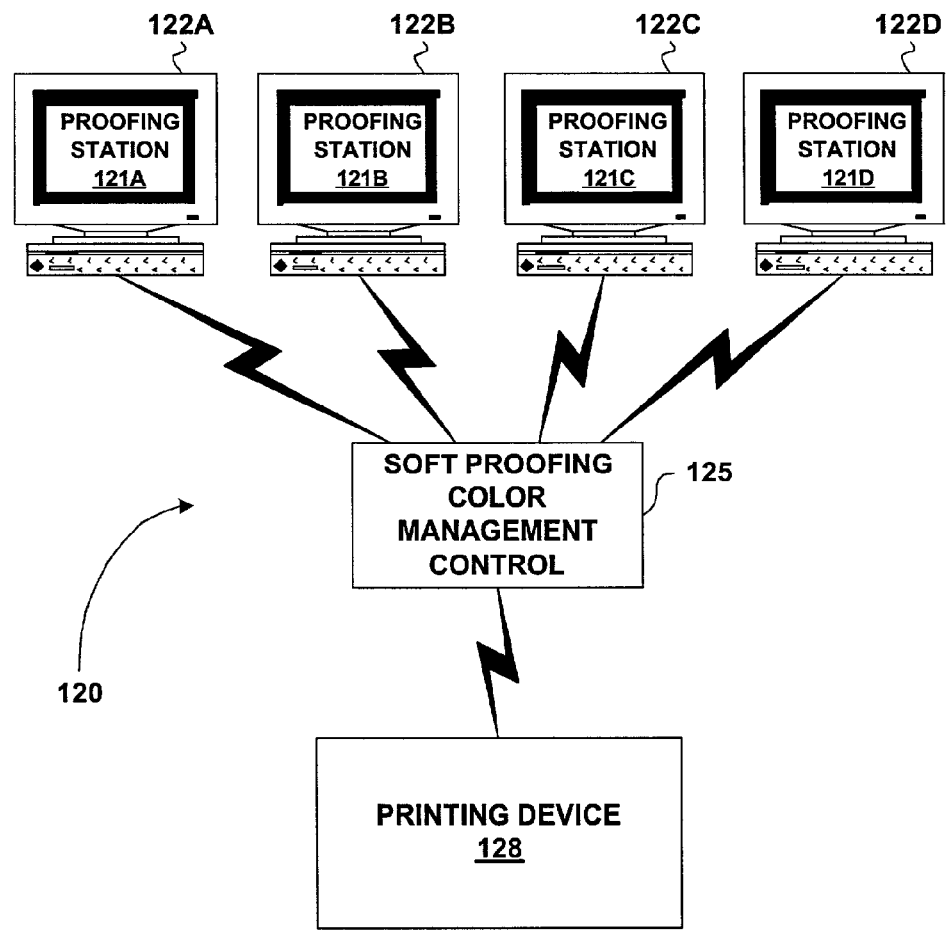
FIG. 12 illustrates an exemplary soft proofing system incorporating a display device in accordance with the invention.

FIG. 12 illustrates an exemplary soft proofing system 120. Soft proofing system 120 may implement one or more aspects of the invention to realize accurate color generation and color matching in a proofing process. Soft proofing system 120 may include one or more proofing stations 121A–121D. The proofing stations 121A–121D may include displays devices 122A–122D that have internal color matching processors that process color data to facilitate accurate color rendering on the respective display device. Alternatively, the proofing stations 121A–121D may be coupled to color matching hardware units (not shown) that house color matching processors.

Soft proofing system 120 may also include a soft proofing color management control 125. The soft proofing color management control 125, for example, may provide external input to the proofing stations 121A–121D.

Soft proofing system 120 may also include at least one printing device 128 such as a printing press. In operation, soft proofing system 120 may generate a color image at the respective proofing stations 121A–121D. Color specialists may inspect the image at respective proofing stations 121A–121D and may adjust the visual appearance of the image. Once the image looks acceptable at the proofing stations 121A–121D, printing device 128 may be used to mass print large quantities print media that look visually equivalent to the image displayed at the proofing stations 121A–121D. Importantly, implementing the techniques and teachings outlined above can help ensure that the images that appear at the proofing stations 121A–121D will appear visually equivalent to the images printed by printing device 128.

A number of implementations and embodiments of the invention have been described. For instance, a display device has been described that includes an integral color matching processor that processes color data to facilitate accurate color rendering on the display device. The integral processor, for example, may be housed within the display housing or may be housed within a color matching hardware unit that is coupled to the display. Either way, it is understood that various modifications may be made without departing from the spirit and scope of the invention. Accordingly, other implementations and embodiments are within the scope of the following claims.

What is claimed is:

1. A display device comprising:
   a display that presents color images, the display including a housing;
   a processor within the housing of the display that adjusts the color images presented by the display, wherein the processor
   receives color input including input color image data,
   processes the color input based on a source device profile associated with a source imaging device and a display profile associated with the display to generate altered color image data, and
   outputs the altered color image data to the display to present the color image; and
   an archive within the housing and coupled to the processor, wherein the processor:
   checks the archive to determine whether the altered color image data has already been generated for the color input,
   processes the color input to generate the altered color image data if the altered color image data has not already been generated, and
   calls the altered color image data from the archive when the altered color image data has already been generated.

2. The display device of claim 1, wherein the processor receives internal color input and external color input.

3. The display device of claim 1, wherein the color input includes the display profile and the source device profile.

4. The display device of claim 2, wherein the internal color input includes sensed conditions.

5. The display device of claim 2, wherein the external color input includes user input.

6. The display device of claim 2, wherein the external color input includes the input color image data.

7. The display device of claim 1, wherein the processor is an application specific integrated circuit (ASIC).

8. The display device of claim 1, wherein the display is one of the following: Cathode ray tube, flat panel display, digital paper, plasma display, and electronic ink display.

9. The display device of claim 1, wherein the images rendered on the display substantially visually matches an image rendered by the source device associated with the source profile.

10. The display device of claim 1, wherein the archive stores a link indicative of a mapping of the color input from a particular source device to the display device.

11. The display device of claim 1, wherein the archive comprises electrically-erasable-programmable-read-only-memory.

12. The display device of claim 1, wherein the archive comprises random access memory.

13. A method comprising:
receiving color input in a display device;
processing the color input in a processor internally housed within a housing of the display device to generate altered image data;
displaying a color image according to the altered image data;
generating a link indicative of a mapping of the color input from a particular source device to the display device;
storing the link in an archive coupled to the processor;
receiving another color input, the another color input being the same as the color input for which the link was generated; and
accessing the archive to obtain the link without re-generating the altered color image data.

14. The method of claim 13, wherein receiving color input in the display device comprises receiving internal input and external input.

15. The method of claim 14, wherein receiving internal input includes receiving sensed conditions.

16. The method of claim 14, wherein receiving internal input includes receiving a display profile.

17. The method of claim 14, wherein receiving external input includes receiving sensed conditions.

18. The method of claim 14, wherein receiving external input includes receiving image data.

19. The method of claim 14, wherein receiving external input includes receiving a source profile.

20. A system comprising:
a plurality of display devices, each display device including a display defining a housing and a color matching processor internally housed within the housing of each display;
a color management control coupled to the display devices;
at least one printing device coupled to the color management control; and
a plurality of archives, wherein each of the archives is coupled to one of the internally integrated color matching processors, wherein each of the archives store links indicative of mappings of color input from particular source devices to the respective display devices associated with the respective archives.

21. The system of claim 20, wherein each respective color matching processor:
receives color input from the color management unit,
processes the color input; and
outputs altered color image data to the respective display device associated with the respective color matching processor.

22. The system of claim 21, wherein each respective color matching processor receives color input from the respective display device associated with the respective color matching processor.

* * * * *